United States Patent [19]
Colton et al.

[11] Patent Number: 5,294,302
[45] Date of Patent: Mar. 15, 1994

[54] RECOVERY OF MATTER EVAPORATED FROM BARRELS

[76] Inventors: Raymond R. Colton, P.O. Box 216, New York, N.Y. 10023; Raymond R. Gamby, 873-A Heritage Village, Southbury, Conn. 06488; George Spector, 233 Broadway-Room 702, New York City, N.Y. 10279

[21] Appl. No.: 788,841

[22] Filed: Nov. 7, 1991

[51] Int. Cl.$^5$ ............................................. B01D 3/00
[52] U.S. Cl. .................................... 202/164; 159/43.1; 159/901; 202/182; 202/185.3; 202/262; 210/181
[58] Field of Search ............... 202/164, 185.3, 269, 202/201, 262, 252, 182, 200, 183.267.1; 159/43.1, 901; 203/86; 210/259, 260, 266, 175, 181, 182, 176

[56] References Cited

U.S. PATENT DOCUMENTS

| | | | |
|---|---|---|---|
| 529,338 | 11/1894 | Murphy | 202/164 |
| 627,026 | 6/1899 | Viele | 202/164 |
| 639,979 | 12/1899 | Hickey | 202/164 |
| 686,772 | 11/1901 | Seltzer | 202/164 |
| 815,463 | 3/1906 | Naughton | 202/164 |
| 951,110 | 3/1910 | Gilchrist | 202/164 |
| 2,668,622 | 2/1954 | Irvine et al. | 210/266 |
| 3,780,867 | 12/1973 | Zirlis | 210/266 |
| 4,327,184 | 4/1982 | Johnson et al. | 203/DIG. 13 |
| 4,345,972 | 8/1982 | Hannebaum et al. | 203/DIG. 13 |
| 4,345,974 | 8/1982 | McCarthy | 203/DIG. 13 |
| 4,361,462 | 11/1982 | Fujii et al. | 159/49 |
| 4,911,840 | 3/1990 | Underwood | 210/266 |
| 5,196,117 | 3/1993 | Billiet et al. | 210/260 |

Primary Examiner—Virginia Manoharan

[57] ABSTRACT

A device for collecting evaporated matter from a vat which first collects the evaporated matter and then condense the evaporated matter into a liquid which is recovered and recycled.

4 Claims, 1 Drawing Sheet

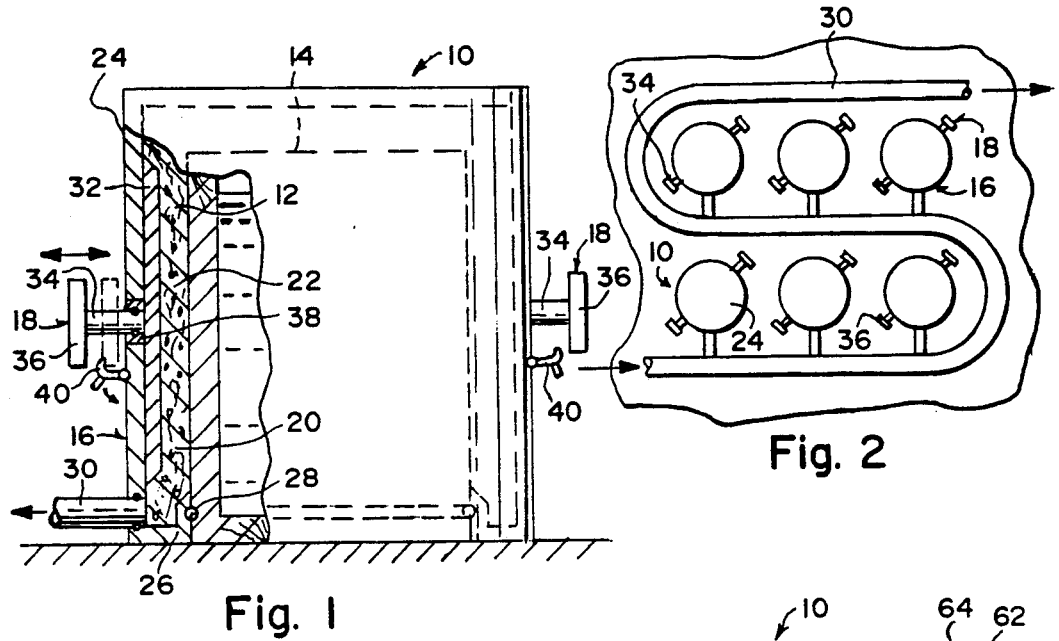
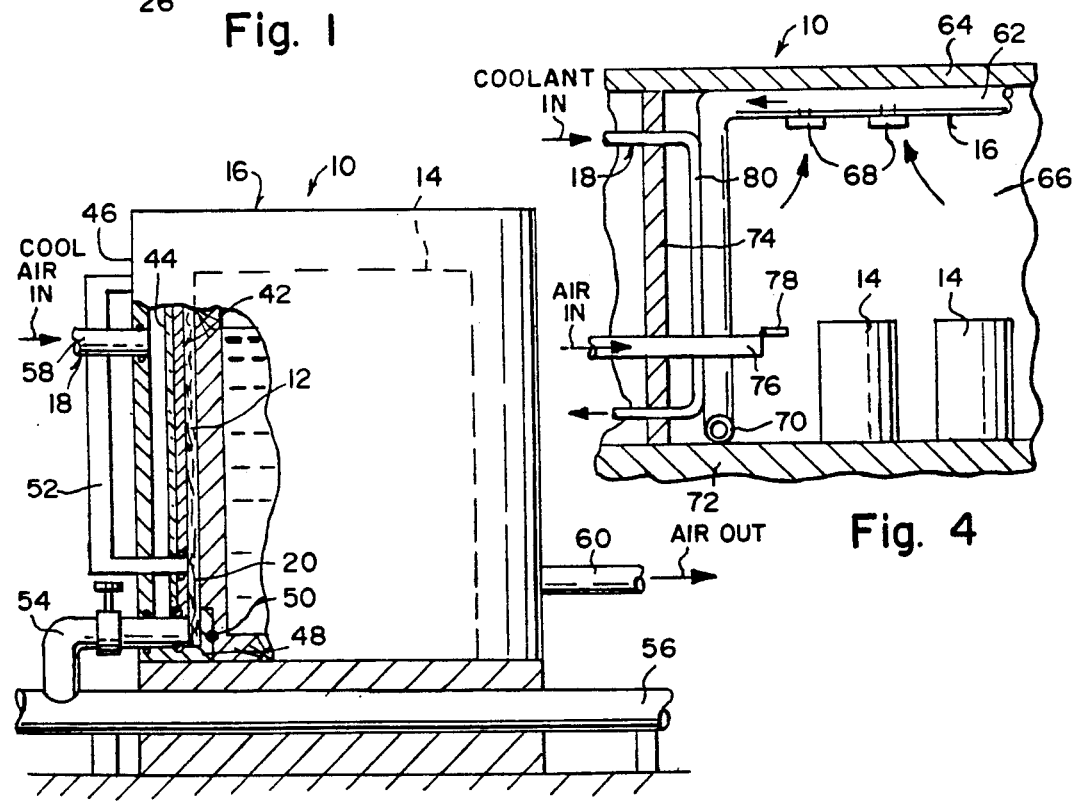
Fig. 1
Fig. 2
Fig. 3
Fig. 4

RECOVERY OF MATTER EVAPORATED FROM BARRELS

BACKGROUND OF THE INVENTION

The instant invention relates generally to liquid processing systems and more specifically it relates to a device for collecting evaporated matter from a vat which provides a mechanism for recovering escaped vapor from the vat.

There are available various conventional liquid processing systems which do not provide the novel improvements of the invention herein disclosed.

SUMMARY OF THE INVENTION

A primary object of the present invention is to provide a device for collecting evaporated matter from a vat that will overcome the shortcomings of the prior art devices.

Another object is to provide a device for collecting evaporated matter from a vat in which an absorbent collector covering the vat contains a mechanism that can squeeze the absorbent collector for recovering and recycling the evaporated matter.

An additional object is to provide a device for collecting evaporated matter from a vat that can cool the evaporated matter coming from the vat which can then be collected in a recovery conduit for recycling.

A further object is to provide a device for collecting evaporated matter from a vat that is simple and easy to use.

A still further object is to provide a device for collecting evaporated matter from a vat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

FIG. 1 is a diagrammatic elevational view with parts broken away and in section of a first embodiment of the instant invention which provides means for collecting evaporated matter from a vat by squeezing an absorbent collector.

FIG. 2 is a diagrammatic top view showing a recovery conduit connected to a series of vats for recycling the evaporated matter therefrom.

FIG. 3 is a diagrammatic elevational view with parts broken away and in section of a second embodiment of the instant invention which collect evaporated matter from the vat by cooling.

FIG. 4 is a diagrammatic cross section of a third embodiment, whereby the vats are in a storage room which condenses evaporated matter from the vats for recycling through a recovery conduit.

DETAILED DESCRIPTION OF THE PREFERRED EMBODIMENTS

Turning now descriptively to the drawings, in which similar reference characters denote similar elements throughout the several views, the Figures illustrate a device 10 for collecting evaporated matter 12 from a vat 14, which consists of a mechanism 16 for gathering the evaporated matter 12 from the vat and another mechanism 18 for condensing the evaporated matter 12 into a liquid 20, so that the liquid 20 can be recovered and recycled.

As shown in FIG. 1, the gathering mechanism 16 includes an absorbent collector 22, which fits over and lines the vat 14. A shield 24 having a bottom inwardly turned flange 26, fits over the absorbent collector 22. A gasket 28 is placed between the flange 26 of the shield 24 and a bottom perimeter of the vat 14 to seal the absorbent collector 22 therein. A recovery conduit 30 is fluidly connected through the bottom of the shield 24. Absorbent collector may be any known liquid absorbing material, the specific material not being the subject of this invention.

The condensing mechanism 18 includes a plunger 32 placed between a side of the absorbent collector 22 and the shield 24. A handle 34 is transversely connected to the plunger 32 and extends through the shield 24. The handle 34 has an enlarged head 36. A sealed bearing 38 is in the shield 24 about the handle 34. A retainer member 40 is pivotally mounted on the shield 24 adjacent the enlarged head 36. When the enlarged head 36 is manually pressed inwardly, the handle 34 will push the plunger 32 against the absorbent collector 22 to squeeze the liquid 20 therefrom into the recovery conduit 30. The retainer member 40 can engage with and hold the enlarged head 36 in its inward position to keep the plunger 32 in its squeezed condition against the absorbent collector 22.

As shown in FIG. 3, the gathering mechanism 16 includes an inner shield 42 which fits over the vat 14 in a spaced relationship, while a glass coating 44 is over the inner shield 42. An outer shield 46 has a bottom inwardly turned flange 48 which fits over the inner shield 42 in a spaced relationship. A gasket 50 is placed between the flange 48 of the outer shield 46 and a bottom perimeter of the vat 14 to seal the inner shield 42 and the glass coating 44 therein. A C-shaped glass sleeve 52 extends through the outer shield 46 and into the inner shield 42. A faucet 54 is fluidly connected through the bottom of the outer shield 46 and into the inner shield 42. A recovery conduit 56 is fluidly connected to the faucet 54.

The condensing mechanism 18 includes a cool air inlet pipe 58 extending into the outer shield 46 adjacent the top end thereof. A cool air outlet pipe 60 extends from the outer shield 46 adjacent the bottom end thereof. The cool air will cause the evaporated matter 12 to condense into the liquid 20 between the inner shield 42 and the vat 14, to travel through the faucet 54 into the recovery conduit 56.

As shown in FIG. 4, the gathering mechanism 16 includes an exhaust pipe 62 mounted to a ceiling 64 of a storage room 66 holding the vat 14 therein. A plurality of exhaust fans 68 are mounted to the exhaust pipe 62 over the vat 14. A recovery conduit 70 is fluidly connected to the exhaust pipe 62 that runs form a floor 72 and upwardly in a spaced away relationship from a wall 74 of the storage room 66. An air inlet pipe 76 extends through the wall 74 into the storage room 66. A one-way valve 78 is mounted on the distal end of the air inlet pipe 76 within the storage room 66.

The condensing mechanism 18 includes a coolant pipe 80, which extends through a top portion of the wall 74, runs down against the recovery conduit 70 and then through a bottom portion of the wall 74 of the storage room 66. The coolant within the coolant pipe 80 will cause the evaporated matter 12 to condense into the liquid 20 within said recovery conduit 70.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for collecting evaporated matter from a vat which comprises:
   a) means for gathering the evaporated matter from the vat; and
   b) means for condensing the evaporated matter into a liquid, so that the liquid can be recovered and recycled, wherein said gathering means includes:
   c) an absorbent liquid collector which fits over and lines the vat for absorbing condensed liquid;
   d) a shield having a bottom inwardly turned flange which fits over said absorbent collector;
   e) a gasket which is placed between the flange of said shield and a bottom perimeter of the vat to seal said absorbent collector therein; and
   f) a recovery conduit for re-cycling liquid fluidly connected through the bottom of said shield.

2. An apparatus for collecting evaporated matter from a vat as recited in claim 1, wherein said condensing means includes:
   a) a plunger placed between a side of said absorbent collector and said shield;
   b) a handle transversely connected to said plunger and extending through said shield, said handle having an enlarged head;
   c) a sealed bearing in said shield about said handle; and
   d) a retainer member pivotally mounted on said shield adjacent said enlarged head, so that when said enlarged head is manually pressed inwardly, said handle will push said plunger against said absorbent collector to squeeze the liquid therefrom into said recovery conduit, while said retainer member can engage with and hold said enlarged head in its inward position to keep said plunger in its squeezed condition against said absorbent collector.

3. An apparatus for collecting evaporated matter from a vat which includes:
   a) means for gathering the evaporated matter from the vat; and
   b) means for condensing the evaporated matter into a liquid, so that the liquid can be recovered and recycled, wherein said gathering means further includes:
   c) an inner shield which fits over the vat in a spaced relationship;
   d) a glass coating over said inner shield;
   e) an outer shield having a bottom inwardly turned flange which fits over said inner shield in a spaced relationship;
   f) a gasket which is placed between the flange of said outer shield and a bottom perimeter of the vat to seal said inner shield and said glass coating therein;
   g) a C-shaped glass sleeve extending through said outer shield and into said inner shield;
   h) a faucet fluidly connected through the bottom of said outer shield and into said inner shield; and
   i) a recovery conduit for recycling liquid fluidly connected to said faucet.

4. An apparatus for collecting evaporated matter from a vat as recited in claim 3, wherein said condensing means includes:
   a) a cool air inlet pipe extending into said outer shield adjacent the top end thereof; and
   b) a cool air outlet pipe extending from said outer shield adjacent the bottom end thereof, so that the cool air will cause the evaporated matter to condense into the liquid between said inner shield and the vat to travel through said faucet into said recovery conduit.

* * * * *